(12) United States Patent
Bernard (10) Patent No.: US 11,312,484 B2
(45) Date of Patent: Apr. 26, 2022

(54) AIRCRAFT HAVING CONVERTIBLE TAILBOOM AND LANDING GEAR SYSTEMS

(71) Applicant: Textron Innovations Inc., Providence, RI (US)

(72) Inventor: Guy Bernard, Kirkland (CA)

(73) Assignee: Textron Innovations Inc., Providence, RI (US)

( * ) Notice: Subject to any disclaimer, the term of this patent is extended or adjusted under 35 U.S.C. 154(b) by 127 days.

(21) Appl. No.: 16/815,625

(22) Filed: Mar. 11, 2020

(65) Prior Publication Data
US 2021/0284329 A1    Sep. 16, 2021

(51) Int. Cl.
| | | |
|---|---|---|
| B64C 25/52 | (2006.01) | |
| B64C 5/02 | (2006.01) | |
| B64C 5/06 | (2006.01) | |
| B64C 25/24 | (2006.01) | |
| B64C 29/00 | (2006.01) | |

(52) U.S. Cl.
CPC ............... *B64C 25/52* (2013.01); *B64C 5/02* (2013.01); *B64C 5/06* (2013.01); *B64C 25/24* (2013.01); *B64C 29/0033* (2013.01)

(58) Field of Classification Search
CPC ......... B64C 25/10; B64C 25/14; B64C 25/16; B64C 25/52; B64C 5/10; B64C 5/12; B64C 39/04
See application file for complete search history.

(56) References Cited

U.S. PATENT DOCUMENTS 3,173,632 A * 3/1965 Woods ................... B64C 25/52
                                                  244/100 R
5,395,073 A * 3/1995 Rutan ...................... B64C 3/385
                                                  244/48
(Continued)

FOREIGN PATENT DOCUMENTS

GB        2570342 A      7/2019
WO    WO-2018200879 A1 * 11/2018  ............... B64C 5/08

OTHER PUBLICATIONS

European Exam Report, EPO, Application No. 21155300.3, dated Jul. 19, 2021.

(Continued)

*Primary Examiner* — Richard R. Green
*Assistant Examiner* — William L Gmoser
(74) *Attorney, Agent, or Firm* — Lawrence Youst PLLC (57) ABSTRACT

A tiltwing aircraft convertible between a vertical takeoff and landing flight mode and a forward flight mode includes a fuselage, a tiltwing rotatably coupled to the fuselage and a convertible tailboom and landing gear system rotatably coupled to the fuselage. The tiltwing is rotatable between a substantially vertical position in the vertical takeoff and landing flight mode and a substantially horizontal position in the forward flight mode. The convertible tailboom and landing gear system is rotatable between a landing gear position in the vertical takeoff and landing flight mode and a tailboom position in the forward flight mode. The convertible tailboom and landing gear system includes skids and linkages that rotatably couple the skids to the fuselage. The skids are positioned below the fuselage in the landing gear position and extend aft of the fuselage in the tailboom position.

20 Claims, 9 Drawing Sheets

(56) References Cited

U.S. PATENT DOCUMENTS

| | | | |
|---|---|---|---|
| 5,863,013 A * | 1/1999 | Schmittle | B64C 39/024 244/38 |
| 5,865,399 A * | 2/1999 | Carter, Jr. | B64C 25/10 244/54 |
| 9,896,200 B2 | 2/2018 | Fredericks et al. | |
| 10,913,529 B1 * | 2/2021 | Piasecki | B64C 25/14 |
| 2006/0016931 A1 * | 1/2006 | Malvestuto | B64C 39/04 244/45 R |
| 2009/0045295 A1 * | 2/2009 | Lundgren | B64C 29/0033 244/7 C |
| 2016/0159468 A1 | 6/2016 | Harris, III et al. | |
| 2018/0079500 A1 | 3/2018 | Foskey | |
| 2018/0086446 A1 * | 3/2018 | Alber | B64C 5/02 |
| 2019/0031333 A1 | 1/2019 | Groninga et al. | |

OTHER PUBLICATIONS

European Search Report, EPO, Application No. 21155300.3, dated Jul. 7, 2021.

* cited by examiner

AIRCRAFT HAVING CONVERTIBLE TAILBOOM AND LANDING GEAR SYSTEMS

TECHNICAL FIELD OF THE DISCLOSURE

The present disclosure relates, in general, to aircraft having multiple flight modes including a vertical takeoff and landing flight mode and a forward flight mode and, in particular, to aircraft having a convertible tailboom and landing gear system that converts between a landing gear position in the vertical takeoff and landing flight mode and a tailboom position in the forward flight mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off, hovering and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward and lateral flight. While these attributes make helicopters highly versatile for use in congested, isolated or remote areas, helicopters typically lack the forward airspeed of fixed-wing aircraft due to the phenomena of retreating blade stall and advancing blade compression.

In an attempt to overcome this speed drawback, tiltrotor aircraft and tiltwing aircraft utilize rotatable proprotors or wings, respectively, that can change their plane of rotation based on the operation being performed. Tiltwing aircraft utilize a wing capable of rotating between a vertical orientation in VTOL flight and a horizontal orientation in forward flight. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane.

Tiltrotor and tiltwing aircraft typically include both a tailboom, or tail section, and landing gear. The tailboom and landing gear, however, are not equally necessary in all flight modes. For example, the landing gear is used to takeoff and land in VTOL flight and the tailboom is used to stabilize the aircraft in forward flight. Having a structural separation of the tailboom and landing gear on existing tiltrotor and tiltwing aircraft results in several drawbacks including the additional weight of supporting two separate systems, drag induced by the landing gear in forward flight, drag induced by the tailboom in VTOL flight and a larger footprint of the aircraft during takeoff, landing and storage. Accordingly, a need has arisen for aircraft that overcome these and other deficiencies of fixed-wing, VTOL, tiltrotor and tiltwing aircraft, and in particular for combining the tailboom and landing gear of an aircraft into a single convertible system that lowers the weight, cost, drag and footprint of the aircraft.

SUMMARY

In a first aspect, the present disclosure is directed to a tiltwing aircraft that is convertible between a vertical takeoff and landing flight mode and a forward flight mode. The tiltwing aircraft includes a fuselage, a tiltwing rotatably coupled to the fuselage and a convertible tailboom and landing gear system rotatably coupled to the fuselage. The tiltwing is rotatable between a substantially vertical position in the vertical takeoff and landing flight mode and a substantially horizontal position in the forward flight mode. The convertible tailboom and landing gear system is rotatable between a landing gear position in the vertical takeoff and landing flight mode and a tailboom position in the forward flight mode. The convertible tailboom and landing gear system includes skids and linkages that rotatably couple the skids to the fuselage. The skids are positioned below the fuselage in the landing gear position and extend aft of the fuselage in the tailboom position.

In some embodiments, the tiltwing may include one or more ailerons. In certain embodiments, the tiltwing may be fixedly coupled to at least one of the linkages such that the tiltwing may be rotatably coupled to the fuselage via the linkages. In some embodiments, the convertible tailboom and landing gear system may include a stabilizer coupled to an aft portion of the skids. In certain embodiments, the stabilizer may include a horizontal stabilizer and one or more vertical fins, and the horizontal stabilizer may be coupled to the skids via the vertical fin(s). In some embodiments, the horizontal stabilizer may be rotatably coupled to the vertical fin(s). In such embodiments, the horizontal stabilizer may be rotatable into various positions including a substantially vertical position in the vertical takeoff and landing flight mode and a substantially horizontal position in the forward flight mode. In certain embodiments, the vertical fin(s) may include a rotatable rudder.

In some embodiments, the convertible tailboom and landing gear system may be rotatable through an angular range of motion of at least 90 degrees. In certain embodiments, the angular range of motion between the landing gear position and the tailboom position may be approximately 90 degrees. In some embodiments, the linkages may remain parallel throughout the angular range of motion. In certain embodiments, the skids may remain horizontal throughout the angular range of motion. In some embodiments, the convertible tailboom and landing gear system may include raised tiers coupled to aft portions of the skids and a stabilizer coupled to the raised tiers. In such embodiments, the convertible tailboom and landing gear system may include sloped transitions between the raised tiers and the skids, at least one of the linkages rotatably coupled to one of the sloped transitions. In some embodiments, the skids may include left and right skids.

In certain embodiments, the skids may be adjacent to the underside of the fuselage in the landing gear position and adjacent to the top side of the fuselage in the tailboom position. In some embodiments, the linkages may have aft ends rotatably coupled to the skids via revolute joints. In such embodiments, the aft ends of the linkages may be rotatably coupled to inboard sides of the skids. In certain embodiments, the linkages may have forward ends rotatably coupled to the fuselage via revolute joints. In some embodiments, the forward ends of the linkages may be rotatably coupled to lateral sides of the fuselage. In certain embodiments, the linkages may include left and right leading linkages and left and right trailing linkages. In such embodiments, the leading linkages may have forward ends rotatably coupled to a middle section of the fuselage and the trailing linkages may have forward ends rotatably coupled to an aft section of the fuselage. In some embodiments, the tiltwing may include left and right tiltwings each having an inboard end. In such embodiments, the forward ends of the leading linkages may be fixedly coupled to the inboard ends of the tiltwings such that the tiltwings rotate with the leading linkages.

In some embodiments, the linkages may be approximately vertical in the vertical takeoff and landing flight mode and approximately horizontal in the forward flight mode. In certain embodiments, the tiltwing aircraft may include a proprotor assembly coupled to the tiltwing. In some embodiments, the tiltwing may be forwardly and aftwardly tiltable in the vertical takeoff and landing flight mode to permit thrust vectoring. In certain embodiments, the tiltwing, the proprotor assembly and the linkages may be configured to synchronously rotate between the vertical takeoff and landing flight mode and the forward flight mode. In some embodiments, the tiltwing aircraft may include a coaxial proprotor system rotatably coupled to the fuselage, the coaxial proprotor system having top and bottom proprotor assemblies. In certain embodiments, the tiltwing aircraft may include a proprotor system mount rotatably coupled to the fuselage. In such embodiments, the proprotor system mount may include a forward mount arch configured to rotate with the linkages and the coaxial proprotor system may be coupled to the forward mount arch. In some embodiments, the proprotor system mount may be coupled to the linkages or the tiltwing. In certain embodiments, the tiltwing aircraft may include one or more batteries disposed in a subfloor compartment of the fuselage.

In a second aspect, the present disclosure is directed to an aircraft including a fuselage and a convertible tailboom and landing gear system rotatably coupled to the fuselage. The convertible tailboom and landing gear system includes skids and linkages that rotatably couple the skids to the fuselage. The aircraft is convertible between a vertical takeoff and landing flight mode and a forward flight mode. The convertible tailboom and landing gear system is rotatable between various positions including a landing gear position in the vertical takeoff and landing flight mode and a tailboom position in the forward flight mode. The skids are positioned below the fuselage in the landing gear position and extend aft of the fuselage in the tailboom position.

In some embodiments, the aircraft may include left and right tiltwings rotatably coupled to the fuselage. In such embodiments, left and right proprotor assemblies may be coupled to the outboard ends of the tiltwings. In certain embodiments, the aircraft may include a conversion motor configured to rotate at least one of the linkages to transition the convertible tailboom and landing gear system between the landing gear position and the tailboom position. In some embodiments, the conversion motor may be disposed in the fuselage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Referring to FIGS. 1A-1F in the drawings, a tiltwing aircraft is schematically illustrated and generally designated 10. Tiltwing aircraft 10 includes a fuselage 12 interposed between articulating tiltwings 14, 16. Fuselage 12 houses a power system 18 to provide power to the various systems of tiltwing aircraft 10. Power system 18 includes batteries 20 disposed in a subfloor compartment 22 of fuselage 12. In other embodiments, power system 18 may include an internal combustion engine, a generator, a renewable energy source such as solar panels or any other type of power source. The forward section of fuselage 12 includes an occupant cabin 24 for one or more pilots and/or occupants. In other embodiments, tiltwing aircraft 10 may be an unmanned aerial system and include no occupants. Fuselage 12 forms a payload bay 26 in which a payload 28 is received. In some embodiments, payload 28 may be a releasable payload that is secured to payload bay 26 while tiltwing aircraft 10 is grounded, and which is released from payload bay 26 while tiltwing aircraft 10 is either on the ground or in flight. The different types of payloads that are receivable by payload bay 26 are numerous. For example, payload 28 may include a weapon, video camera, infrared imaging device, high definition camera, chemical sensor, cargo, passenger belongings or any other suitable payload. In a more specific example, a weapon such as a bomb or cargo such as a deliverable package may be released from payload bay 26 either on the ground or during flight. Payload bay 26 may also store passenger luggage or belongings in embodiments in which tiltwing aircraft 10 serves as an air taxi. Payload 28 may be configured to provide data to a flight control system of tiltwing aircraft 10 and the flight control system may be configured to control, manipulate or release payload 28. In other embodiments, fuselage 12 may lack payload bay 26 and instead the aft section of fuselage 12 may be used as an occupant cabin, thereby increasing the occupant cabin space of tiltwing aircraft 10.

Tiltwings 14, 16 are rotatably coupled to the lateral sides of fuselage 12. Tiltwings 14, 16 have a straight wing configuration. In other embodiments, tiltwings 14, 16 may have an anhedral or dihedral wing configuration. Instead of tiltwings 14, 16 forming separate left and right tiltwings, tiltwings 14, 16 may instead form a single, unitary tiltwing that extends over, through or under fuselage 12. Ailerons 30 on the aft edges of tiltwings 14, 16 may be used to manage the pitch, roll and/or yaw of tiltwing aircraft 10 during flight. Left and right proprotor assemblies 32, 34 are fixedly coupled to the outboard ends of tiltwings 14, 16, respectively. Power system 18 provides power to electric motors (not shown) in proprotor assemblies 32, 34. In some embodiments, the motors may include redundant dual winding motors with overrun clutches. Proprotor assemblies 32, 34 each include a proprotor hub assembly and three proprotor blades 36, although in other embodiments proprotor assemblies 32, 34 can alternatively have a different number of proprotor blades. Proprotor blades 36 have approximately the same length but could alternatively have nonuniform lengths. Proprotor assemblies 32, 34 may rotate in either direction. For example, left and right proprotor assemblies 32, 34 may counter rotate relative to one another to balance the torque on tiltwing aircraft 10.

Proprotor blades 36 may be fixed or variable pitch proprotor blades. In embodiments in which proprotor blades 36 are fixed pitch proprotor blades, proprotor assemblies 32, 34 may each be capable of a variable rotational speed. The respective torques and revolutions per minute (RPMs) of proprotor assemblies 32, 34 may be independently controllable from one another, thereby allowing proprotor assemblies 32, 34 to have the same or differing torques, RPMs or resultant thrusts. For example, proprotor assembly 32 may selectively spin faster than proprotor assembly 34 to produce a differential thrust that affects the orientation of tiltwing aircraft 10.

In embodiments in which proprotor blades 36 are variable pitch proprotor blades, proprotor blades 36 may be operably connected to a swashplate and have collective and/or cyclic control. The pitch of proprotor blades 36 can be collectively and/or cyclically manipulated to selectively control direction, thrust and lift of tiltwing aircraft 10. A collective control may be used to control the altitude and/or speed of tiltwing aircraft 10 by simultaneously changing the pitch angle of all proprotor blades 36 independently of their position. For example, during a stable hover, if pilot input is made to the collective control, the pitch of all proprotor blades 36 changes simultaneously and equally, resulting in tiltwing aircraft 10 either increasing or decreasing in altitude. A cyclic control may be used to control the attitude and/or direction of tiltwing aircraft 10 by controlling the pitch of proprotor blades 36 cyclically, that is, the pitch of each proprotor blade 36 will vary during each rotation. The variation in pitch has the effect of varying the angle of attack of, and thus the lift generated by, each proprotor blade 36 as it rotates. Thus, if the cyclic control is moved forward or backward while tiltwing aircraft 10 hovers, proprotor assemblies 32, 34 generate thrust in the forward direction or backward direction, respectively. Similarly, if the cyclic control is moved to the right or to the left while tiltwing aircraft 10 is hovering, proprotor assemblies 32, 34 generate thrust in the right direction or left direction, respectively. In other embodiments, tiltwings 14, 16 may instead be fixedly coupled to fuselage 12 while proprotor assemblies 32, 34 are rotatably coupled to the fixed wings, in which case tiltwing aircraft 10 may be considered a tiltrotor aircraft. While tiltwing aircraft 10 is illustrated as including two proprotor assemblies 32, 34, any number of proprotor assemblies may be coupled to tiltwings 14, 16 and/or fuselage 12. In other embodiments, proprotor assemblies 32, 34 may be mounted at the midspan regions of each tiltwing 14, 16 instead of the outboard ends.

Figure 1A:
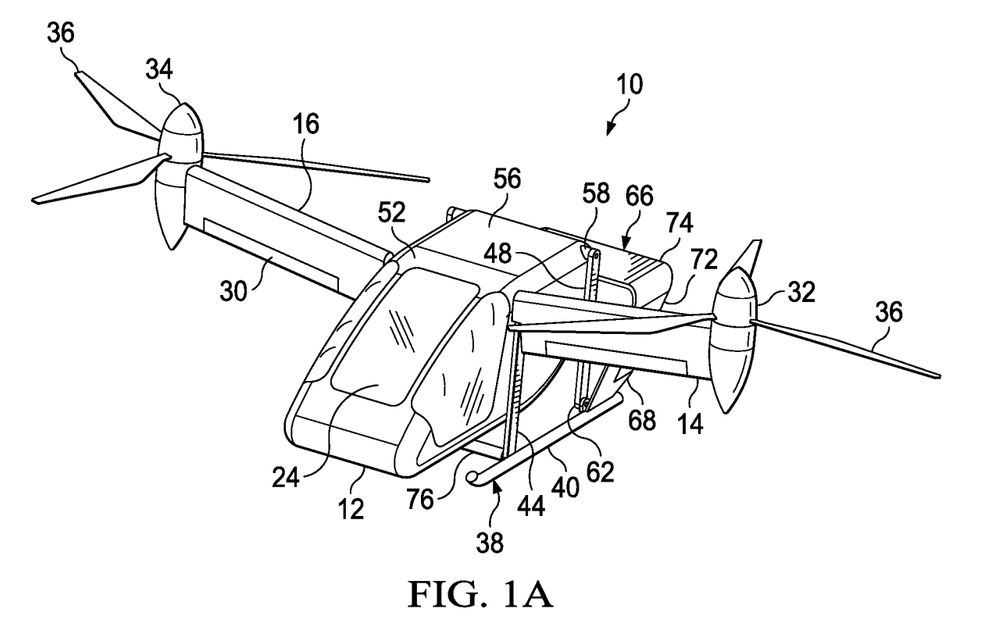
FIGS. 1A-1F are schematic illustrations of a tiltwing aircraft having a convertible tailboom and landing gear system in accordance with embodiments of the present disclosure.
Figure 1B:
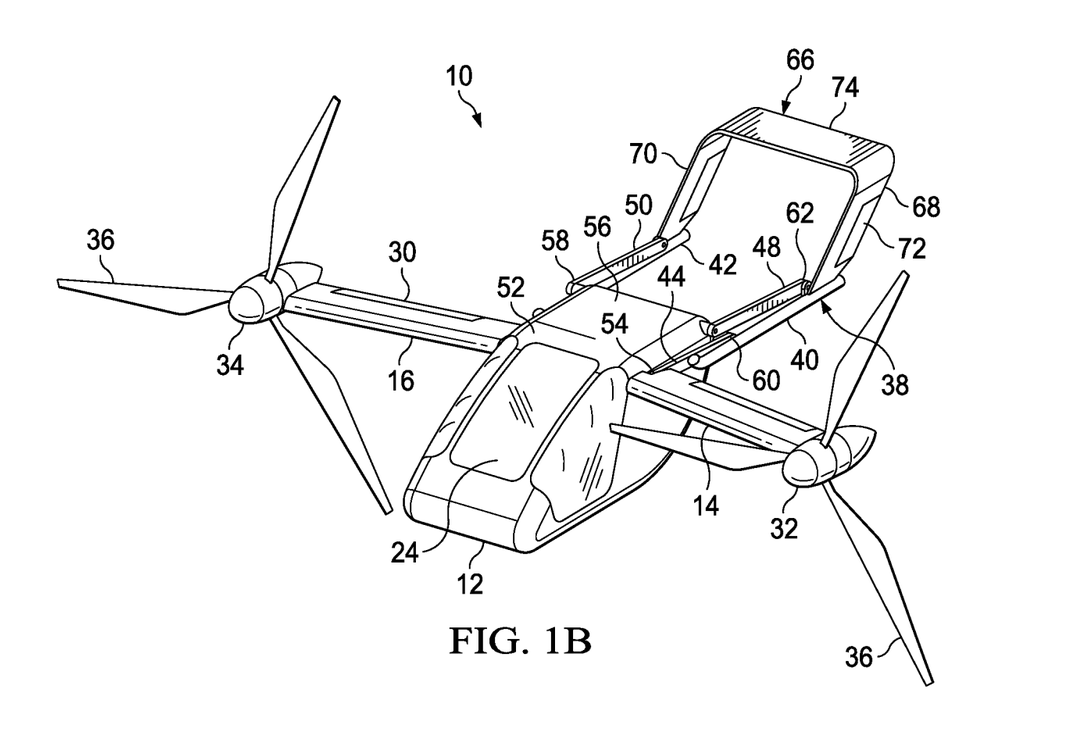
Figure 1C:
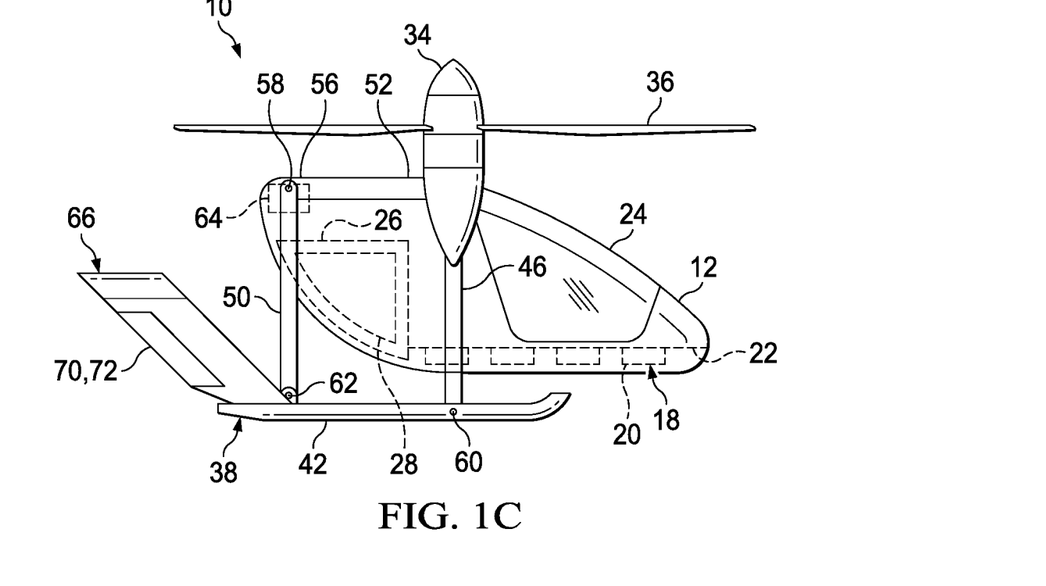
Figure 1D:
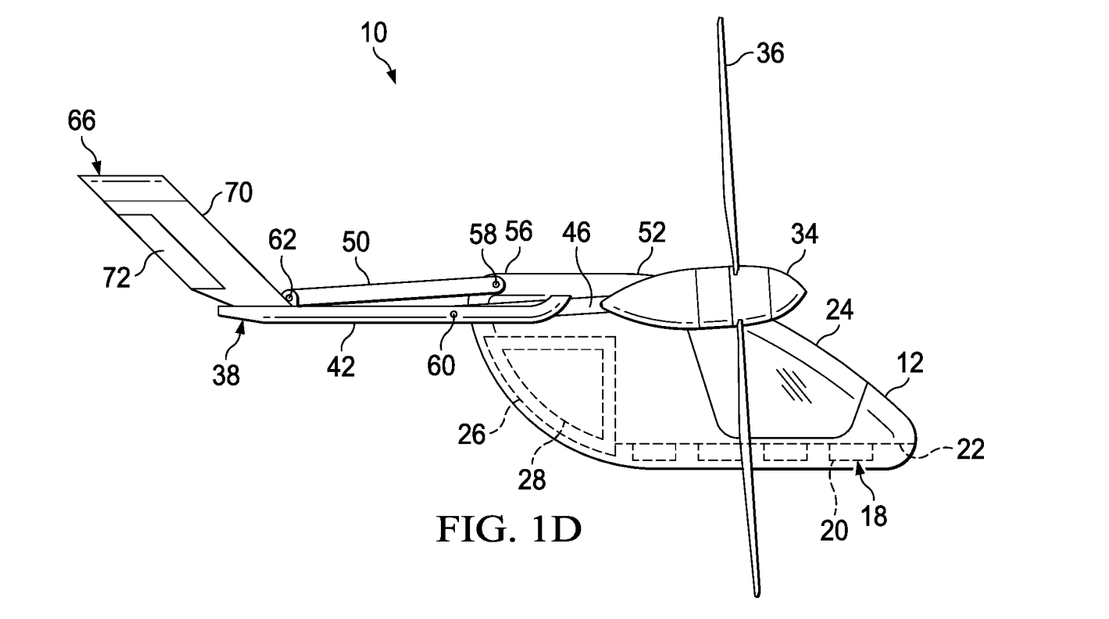
Figures 1E, 1F:
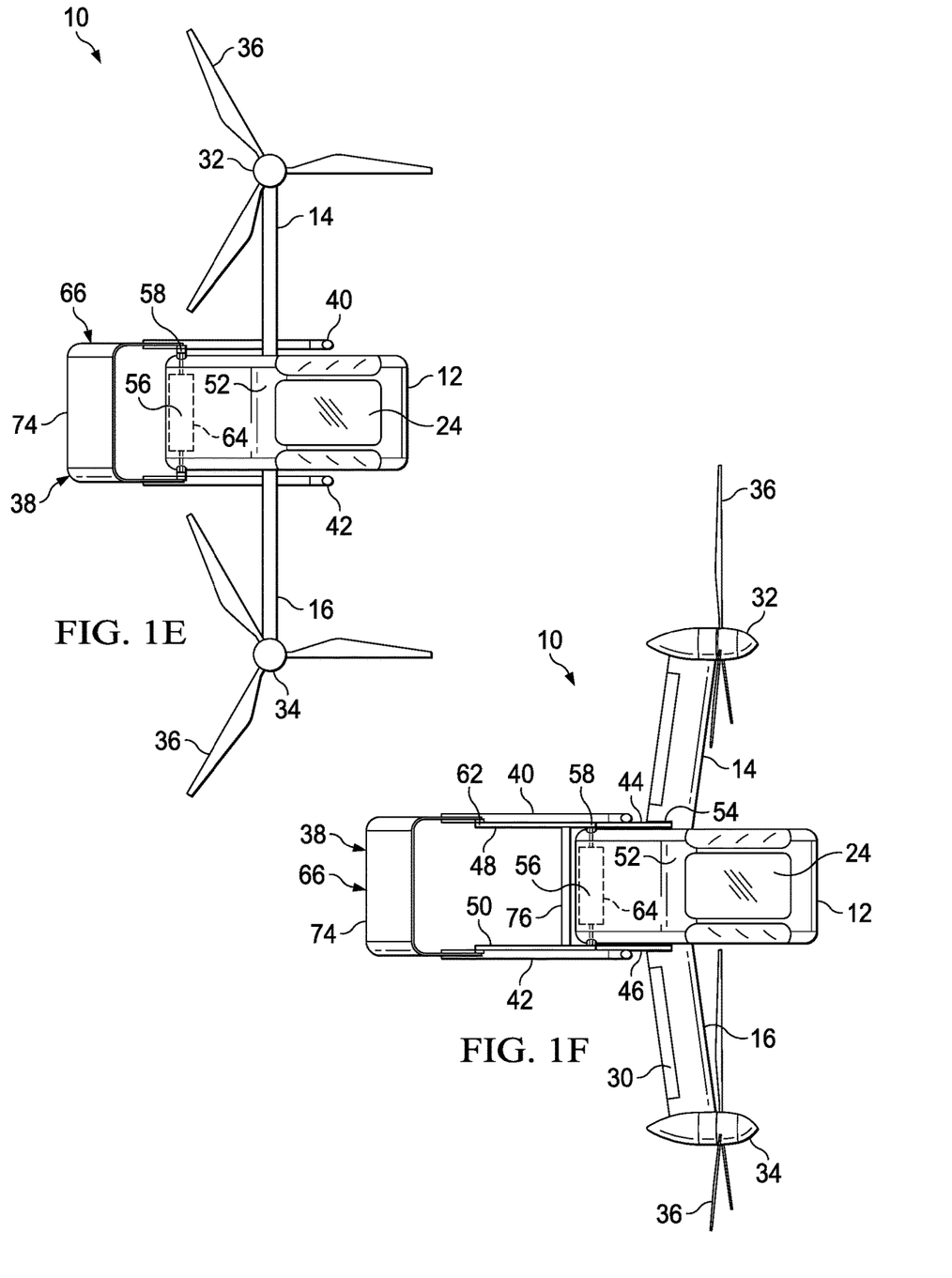

FIGS. 1A, 1C and 1E illustrate tiltwing aircraft 10 in a vertical takeoff and landing (VTOL) flight mode, which includes takeoff, landing and hover operations. In the VTOL flight mode, tiltwings 14, 16 and proprotor assemblies 32, 34 are vertically oriented and proprotor blades 36 rotate in a substantially horizontal plane to provide a lifting thrust such that tiltwing aircraft 10 flies much like a conventional helicopter. Directional control in the VTOL flight mode may be achieved in a number of ways. For example, tiltwings 14, 16 may be forwardly and aftwardly tiltable in the VTOL flight mode to permit thrust vectoring in the forward and aft directions. Flight direction in the VTOL flight mode may also be controlled using the collective and/or cyclic control of proprotor blades 36. In other embodiments, flight direction in the VTOL flight mode may be controlled by modulating the thrust generated by proprotor assemblies 32, 34. Managing the orientation of tiltwing aircraft 10 in the VTOL flight mode may also be achieved in a number of ways. For example, the yaw of tiltwing aircraft 10 may be controlled using ailerons 30. Roll may be controlled by differentiating the thrust generated between proprotor assemblies 32, 34. Pitch may be controlled by forwardly or aftwardly tilting tiltwings 14, 16 or by cyclically controlling proprotor blades 36. FIGS. 1B, 1D and 1F illustrate tiltwing aircraft 10 in a forward flight mode, in which tiltwings 14, 16 and proprotor assemblies 32, 34 are horizontally oriented and proprotor blades 36 rotate in a substantially vertical plane to provide forward thrust while tiltwings 14, 16 provide a lifting force similar to a conventional propeller driven aircraft. Fuselage 12 remains in a horizontal orientation in both the VTOL flight mode and the forward flight mode. In addition, tiltwing aircraft 10 can perform certain flight maneuvers with proprotor assemblies 32, 34 positioned between the VTOL flight mode and the forward flight mode, which can be referred to as conversion flight mode.

Tiltwing aircraft 10 includes a convertible tailboom and landing gear system 38 rotatably coupled to fuselage 12. Convertible tailboom and landing gear system 38 rotates between a landing gear position in the VTOL flight mode as shown in FIGS. 1A, 1C and 1E and a tailboom position in the forward flight mode as shown in FIGS. 1B, 1D and 1F. Convertible tailboom and landing gear system 38 includes left and right skids 40, 42 on which tiltwing aircraft 10 lands while in the VTOL flight mode. In the landing gear position, skids 40, 42 are positioned below fuselage 12 and are adjacent to an underside of fuselage 12. In the tailboom position, skids 40, 42 extend aft of fuselage 12 and are adjacent to a top side of fuselage 12. Thus, convertible tailboom and landing gear system 38 is capable of retracting skids 40, 42 and relocating or transforming them for use as the tailboom of tiltwing aircraft 10 in the forward flight mode. Skids 40, 42 may be beams having any cross-sectional shape such as tubular beams. In some embodiments, the underside of skids 40, 42 may include wheels to allow for rolling landings.

Convertible tailboom and landing gear system 38 includes left and right leading linkages 44, 46 and left and right trailing linkages 48, 50 rotatably coupling skids 40, 42 to the left and right, or lateral, sides of fuselage 12, respectively. The forward ends of leading linkages 44, 46 are rotatably coupled to the lateral sides of middle section 52 of fuselage 12 via revolute joints 54. In some embodiments, the forward ends of leading linkages 44, 46 may be fixedly coupled to the inboard ends of tiltwings 14, 16, respectively, such that tiltwings 14, 16 rotate with leading linkages 44, 46. The forward ends of trailing linkages 48, 50 are rotatably coupled to the lateral sides of aft section 56 of fuselage 12 via revolute joints 58. The forward ends of leading linkages 44, 46 and trailing linkages 48, 50, while shown as rotatably coupled to middle and aft sections 52, 56 of fuselage 12, respectively, may be rotatably coupled to any section or side of fuselage 12 at any location. The aft ends of leading linkages 44, 46 are rotatably coupled to the inboard sides of skids 40, 42, respectively, via revolute joints 60. The aft ends of trailing linkages 48, 50 are rotatably coupled to the inboard sides of skids 40, 42, respectively, via revolute joints 62. While the illustrated embodiment includes four linkages 44, 46, 48, 50, skids 40, 42 may be rotatably coupled to fuselage 12 by any number of linkages such as one, two, six or eight linkages, for example. Also, each linkage 44, 46, 48, 50 may be a single integral beam or alternatively may be formed from two or more linkage beam portions.

Tiltwing aircraft 10 includes a conversion motor 64 disposed in aft section 56 of fuselage 12 coupled to trailing linkages 48, 50 that rotates linkages 44, 46, 48, 50 to transition convertible tailboom and landing gear system 38 between the landing gear position shown in FIGS. 1A, 1C and 1E and the tailboom position shown in FIGS. 1B, 1D and 1F. Conversion motor 64 may be any type of motor or actuator such as, for example, a servomotor, tiltwing motor, stepper motor or dual servo conversion actuator. Tiltwing aircraft 10 may include any number of conversion motors to rotate linkages 44, 46, 48, 50. In some embodiments, conversion motor 64 may include a clutch (not shown) that is configured to lock convertible tailboom and landing gear system 38 in predetermined positions. Conversion motor 64 rotates trailing linkages 48, 50 such that tiltwings 14, 16, proprotor assemblies 32, 34 and linkages 44, 46, 48, 50 synchronously rotate between the VTOL flight mode and the forward flight mode. In other embodiments, conversion motor 64 may be directly coupled to leading linkages 44, 46.

Conversion motor 64 may rotate convertible tailboom and landing gear system 38 through an angular range of motion of 90 degrees or more. The angular range of motion between the landing gear position shown in FIGS. 1A, 1C and 1E and the tailboom position shown in FIGS. 1B, 1D and 1F is approximately 90 degrees. Linkages 44, 46, 48, 50 remain substantially parallel and skids 40, 42 remain substantially horizontal throughout this angular range of motion. Also, linkages 44, 46, 48, 50 are approximately vertical in the VTOL flight mode and approximately horizontal in the forward flight mode. In some embodiments, while hovering in the VTOL flight mode conversion motor 64 may be utilized to forwardly and/or aftwardly tilt or angle tiltwings 14, 16 to permit thrust vectoring, thus allowing tiltwing aircraft 10 to maintain a desired hover position in high crosswinds. Prior aircraft configurations have required two or more tilt servomotors, one at each rotor, for crosswind control. Tiltwing aircraft 10 has no such requirement and therefore benefits from reduced weight and complexity.

Convertible tailboom and landing gear system 38 includes a stabilizer 66 on skids 40, 42. Stabilizer 66 includes vertical fins 68, 70 protruding from the top sides of the aft portion of skids 40, 42, respectively. In some embodiments, vertical fins 68, 70 each include a rotatable rudder 72. Stabilizer 66 also includes a horizontal stabilizer 74 coupled to skids 40, 42 via vertical fins 68, 70. Horizontal stabilizer 74 acts as a bridge between vertical fins 68, 70. In some embodiments, horizontal stabilizer 74 may include one or more elevators (not shown). The control surfaces on stabilizer 66 may be used to manage the orientation of tiltwing aircraft 10 in the forward flight mode. For example, vertical fins 68, 70 including rudders 72 may be used to manage the yaw of tiltwing aircraft 10 in the forward flight mode. A suitable pitch for tiltwing aircraft 10 may be maintained using horizontal stabilizer 74 including any elevators thereon. The roll of tiltwing aircraft 10 in the forward flight mode may be controlled using ailerons 30. In some embodiments, convertible tailboom and landing gear system 38 may include a crossbeam 76 interposed between the aft ends of left and right leading linkages 44, 46 and between skids 40, 42 to reduce the bending moment on the spar(s) of tiltwings 14, 16 while tiltwing aircraft 10 is in the VTOL flight mode, thus allowing the cross-section of the spar(s) of tiltwings 14, 16 to be reduced.

Convertible tailboom and landing gear system 38 bestows numerous benefits on tiltwing aircraft 10. For example, in the VTOL flight mode tiltwing aircraft 10 has a low profile when landing or traveling in an upward direction since convertible tailboom and landing gear system 38 is tucked beneath fuselage 12. The landing gear position of convertible tailboom and landing gear system 38 also decreases the storage footprint of tiltwing aircraft 10. Because convertible tailboom and landing gear system 38 extends aft of fuselage 12 in the tailboom position, tiltwing aircraft 10 has a low forward facing profile in the forward flight mode to reduce drag and allow for increased mission range and efficiency. The reusability of skids 40, 42 as both landing skids and a tailboom lowers the weight, cost and part count of tiltwing aircraft 10. Furthermore, the center of gravity of tiltwing aircraft 10 remains substantially stable during conversion between the landing gear position and the tailboom position of convertible tailboom and landing gear system 38. The rotor configuration of tiltwing aircraft 10 also provides high hover power efficiency.

Tiltwing aircraft 10 may be any size or weight based on many factors such as desired payload or intended functionality. Tiltwing aircraft 10 may also be scalable to any size from miniature drone implementations to piloted implementations. For example, tiltwing aircraft 10 may be implemented as a micro unmanned aerial system, mini VTOL vehicle, personal recreational vehicle, air taxi or energy efficient electric vehicle. In other embodiments, tiltwing aircraft 10 may be one of a multitude of deployable swarm unmanned aerial systems capable of intercommunication and coordinated missions. Tiltwing aircraft 10 may be easily storable and deployable for ease of transport when not in use. It should be appreciated that tiltwing aircraft 10 is merely illustrative of a variety of aircraft that can implement the features and embodiments disclosed herein. For example, those skilled in the art will recognize that convertible tailboom and landing gear system 38 disclosed herein can be integrated into a variety of aircraft configurations. It should be appreciated that even though aircraft are particularly well-suited to implement the features and embodiments of the present disclosure, non-aircraft vehicles and devices can also implement the embodiments.

Figure 2:
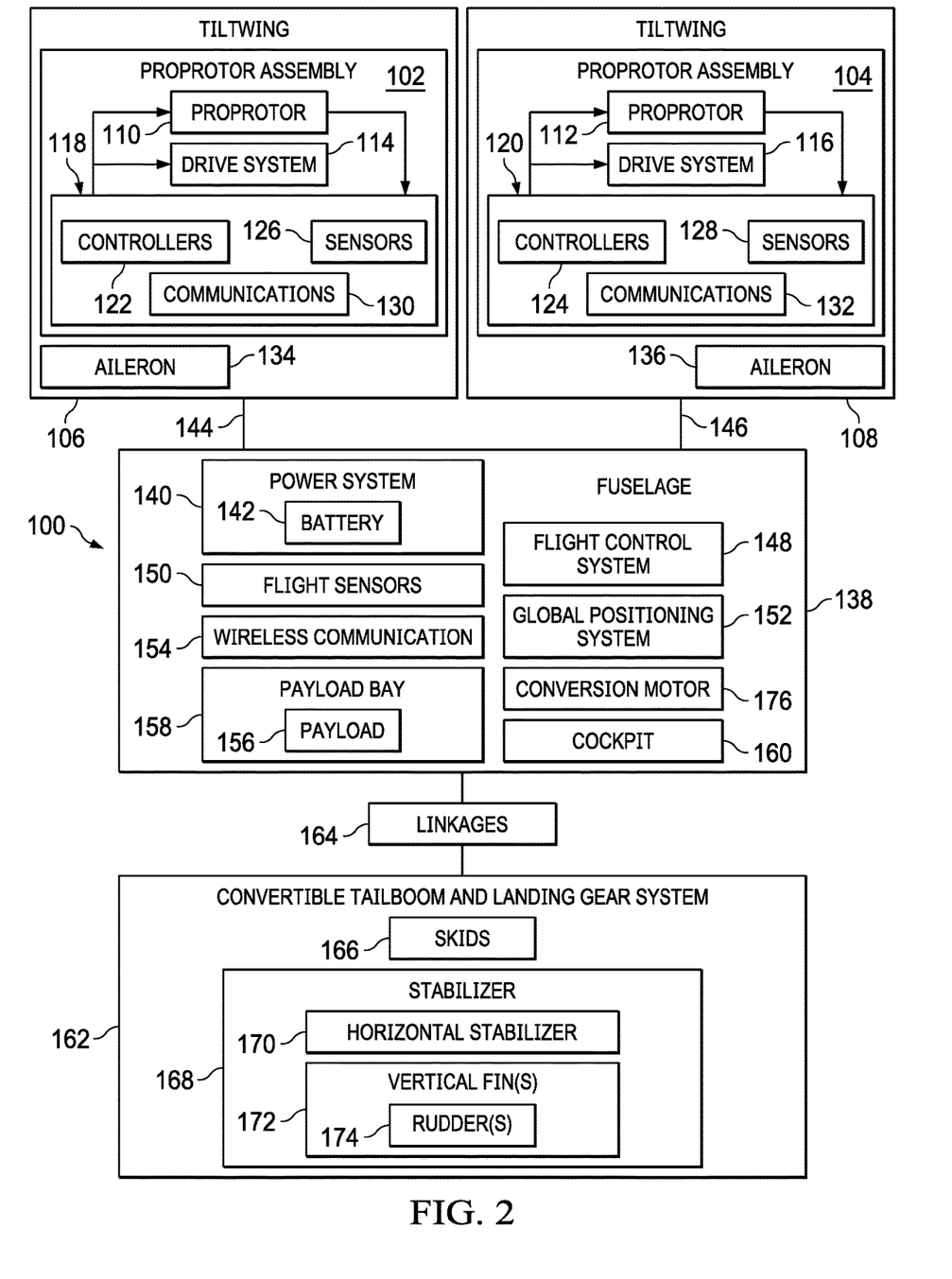
FIG. 2 is a block diagram of a propulsion and control system for a tiltwing aircraft having a convertible tailboom and landing gear system in accordance with embodiments of the present disclosure.

Referring to FIG. 2 in the drawings, a propulsion and control system for a tiltwing aircraft such as tiltwing aircraft 10 in FIGS. 1A-1F is schematically illustrated and generally designated 100. Proprotor assemblies 102, 104 on tiltwings 106, 108 each include a proprotor 110, 112, a drive system 114, 116 including an electric motor and an electronics node 118, 120 including, for example, controllers 122, 124, sensors 126, 128 and communications elements 130, 132, respectively, as well as other components suitable for use in the operation of proprotor assemblies 102, 104. Each proprotor 110, 112 includes a plurality of proprotor blades radiating therefrom. In some embodiments, proprotor assemblies 102, 104 each include one or more actuators (not shown) to adjust the collective and/or cyclic pitch of the proprotor blades. Tiltwings 106, 108 include ailerons 134, 136 to manage the orientation of tiltwing aircraft 100.

Fuselage 138 includes power system 140 that may serve as the electrical energy source for proprotor assemblies 102, 104, including proprotors 110, 112, drive systems 114, 116 and electronics nodes 118, 120. Power system 140 may include one or more batteries 142. Battery 142 may be charged by an electrical energy generation system (not shown), such as an internal combustion engine, or may be charged at a ground station. Battery 142 may also be interchangeably removed and installed to enable efficient refueling which may be particularly beneficial in embodiments of tiltwing aircraft 100 wherein the sole electrical energy source is battery 142. In embodiments that include an electrical energy generation system such as an internal combustion engine housed within fuselage 138, the electrical energy generation system may include one or more fuel tanks such as liquid fuel tanks. In one non-limiting example, an internal combustion engine may be used to drive an electric generator that produces electrical energy that is fed to proprotor assemblies 102, 104 via communication lines 144, 146 to power proprotors 110, 112, drive systems 114, 116 and electronics nodes 118, 120. In other embodiments, tiltwing aircraft 100 may implement a hybrid power system including both an internal combustion engine and batteries. This type of hybrid power system may be beneficial in that the energy density of liquid fuel exceeds that of batteries enabling greater endurance for tiltwing aircraft 100. In the hybrid power system, battery 142 may provide a backup electrical power source to enable tiltwing aircraft 100 to safely land in the event of a failure of the internal combustion engine. In yet other embodiments, each proprotor assembly 102, 104 may include a respective battery to provide backup battery power in the event of a failure of power system 140. As another alternative, proprotor assemblies 102, 104 may include hydraulic motors operating within a common hydraulic fluid system wherein one or more high pressure hydraulic sources or generators are housed within fuselage 138 to provide power to each of the hydraulic motors.

In the illustrated embodiment, tiltwing aircraft 100 includes a flight control system 148 housed within fuselage 138. Flight control system 148, such as a digital flight control system, may preferably be a redundant flight control system and more preferably a triply redundant flight control system including three independent flight control computers. Use of triply redundant flight control system 148 improves the overall safety and reliability of tiltwing aircraft 100 in the event of a failure of flight control system 148. Flight control system 148 preferably includes non-transitory computer readable storage media including a set of computer instructions executable by one or more processors for controlling the operation of proprotor assemblies 102, 104. Flight control system 148 may be implemented on one or more general purpose computers, special purpose computers or other machines with memory or processing capability. For example, flight control system 148 may include one or more memory storage modules including, but not limited to, internal storage memory such as random access memory, non-volatile memory such as read only memory, removable memory such as magnetic storage memory, optical storage, solid-state storage memory or other suitable memory storage. Flight control system 148 may be a microprocessor-based system operable to execute program code in the form of machine executable instructions. In addition, flight control system 148 may be selectively connectable to other computer systems via a proprietary encrypted network, a public encrypted network, the Internet or other suitable communication network that may include both wired and wireless connections.

Flight control system 148 communicates via a wired and/or wireless communications network with electronics nodes 118, 120 of each proprotor assembly 102, 104. In some embodiments, electronics nodes 118, 120 may instead be combined and centralized into fuselage 138. Flight control system 148 receives sensor data from and sends flight command information to electronics nodes 118, 120 such that each proprotor assembly 102, 104 may be individually and independently controlled and operated. Flight control system 148 is configured to receive inputs from flight sensors 150 such as, but not limited to, gyroscopes, accelerometers or any other suitable sensing equipment configured to provide flight control system 148 with spatial, positional or force dynamics information, feedback or other data that may be utilized to manage the operation of tiltwing aircraft 100. For example, flight control system 148 may use sensor data from flight sensors 150 to generate and send flight command information to electronics node 118 to control proprotor assembly 102. Tiltwing aircraft 100 may include global positioning system 152 configured to determine, receive and/or provide data related to the location of tiltwing aircraft 100 including flight destinations, targets, no-fly zones, preplanned routes, flight paths or any other geospatial location-related information. Global positioning system 152 may be configured for bidirectional communication with flight control system 148, unidirectional communication from global positioning system 152 to flight control system 148 or unidirectional communication from flight control system 148 to global positioning system 152.

Tiltwing aircraft 100 may include wireless communication components 154 such as radio communication equipment configured to send and receive signals related to flight commands or other operational information. Wireless communication components 154 may be configured to transmit video, audio or other data gathered, observed or otherwise generated, carried by or obtained by tiltwing aircraft 100. In some embodiments, flight control system 148 may also be operable to communicate with one or more remote systems via wireless communication components 154 using a wireless communications protocol. The remote systems may be operable to receive flight data from and provide commands to flight control system 148 to enable flight control over some or all aspects of flight operation. In other embodiments, tiltwing aircraft 100 may instead be a manned or piloted vehicle. In both manned and unmanned missions, flight control system 148 may autonomously control some or all aspects of flight operation. Transitions between the VTOL flight mode and the forward flight mode may be accomplished responsive to remote flight control, autonomous flight control, onboard pilot flight control or combinations thereof.

Payload 156 is receivable by payload bay 158 and may include a video camera, thermal camera, infrared imaging device, high definition camera, weapon, chemical sensor, cargo, personal belongings such as luggage or any other suitable payload. Payload 156 may be configured to provide data to flight control system 148 and flight control system 148 may be configured to control, manipulate or release payload 156. In piloted implementations, one or more pilots may operate tiltwing aircraft 100 from within cockpit 160.

Convertible tailboom and landing gear system 162 is rotatably coupled to fuselage 138 via linkages 164. Convertible tailboom and landing gear system 162 includes skids 166 to which stabilizer 168 is coupled. Stabilizer 168 includes horizontal stabilizer 170 and one or more vertical fins 172. Vertical fins 172 may include one or more rudders 174. Power system 140 may provide power to conversion motor 176 to transition convertible tailboom and landing gear system 162 between the landing gear position in the VTOL flight mode and the tailboom position in the forward flight mode. Power system 140 may also provide power to control surfaces 134, 136, 174 for pitch, roll and/or yaw control.

Figure 3A:
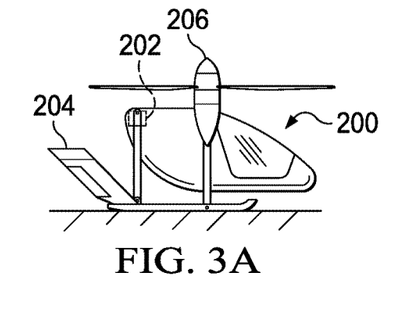
FIGS. 3A-3J are schematic illustrations of a tiltwing aircraft having a convertible tailboom and landing gear system in a sequential takeoff, flight and landing operation scenario in accordance with embodiments of the present disclosure.

Referring to FIGS. 3A-3J in the drawings, a sequential takeoff, flight and landing scenario of tiltwing aircraft 200 is depicted. Tiltwing aircraft 200 includes conversion motor 202 to synchronously rotate convertible tailboom and landing gear system 204 and proprotor assemblies 206 including tiltwings between the VTOL flight mode and the forward flight mode. In FIG. 3A, tiltwing aircraft 200 is in the VTOL flight mode at takeoff and convertible tailboom and landing gear system 204 is in the landing gear position. Proprotor assemblies 206 lift tiltwing aircraft 200 into a hover mode shown in FIGS. 3B and 3C. While hovering, tiltwing aircraft 200 may encounter crosswinds 208, 210. Proprotor assemblies 206 are forwardly and aftwardly tiltable within an angular range of motion to generate both vertical and lateral thrust components to provide lift while countering crosswinds 208, 210. The angular range of motion of proprotor assemblies 206 required to counteract crosswinds 208, 210 may vary widely depending on the strength of crosswinds 208, 210. Tiltwing aircraft 200 may be considered to be in a crosswind configuration when hovering and combating crosswinds 208, 210 in this manner. Tiltwing aircraft 200 may also include a crosswind sensor (not shown) that detects crosswinds 208, 210 and enables tiltwing aircraft 200 to determine the tilt or angle of proprotor assemblies 206 necessary to counter crosswinds 208, 210. Proprotor assemblies 206 may be tilted to counteract crosswinds 208, 210 using conversion motor 202. Vehicle yaw orientation in relation to crosswinds 208, 210 may be achieved via asymmetric deflection of control surfaces such as ailerons 30 in FIGS. 1A-1F.

Figures 3B, 3C, 3D, 3E:
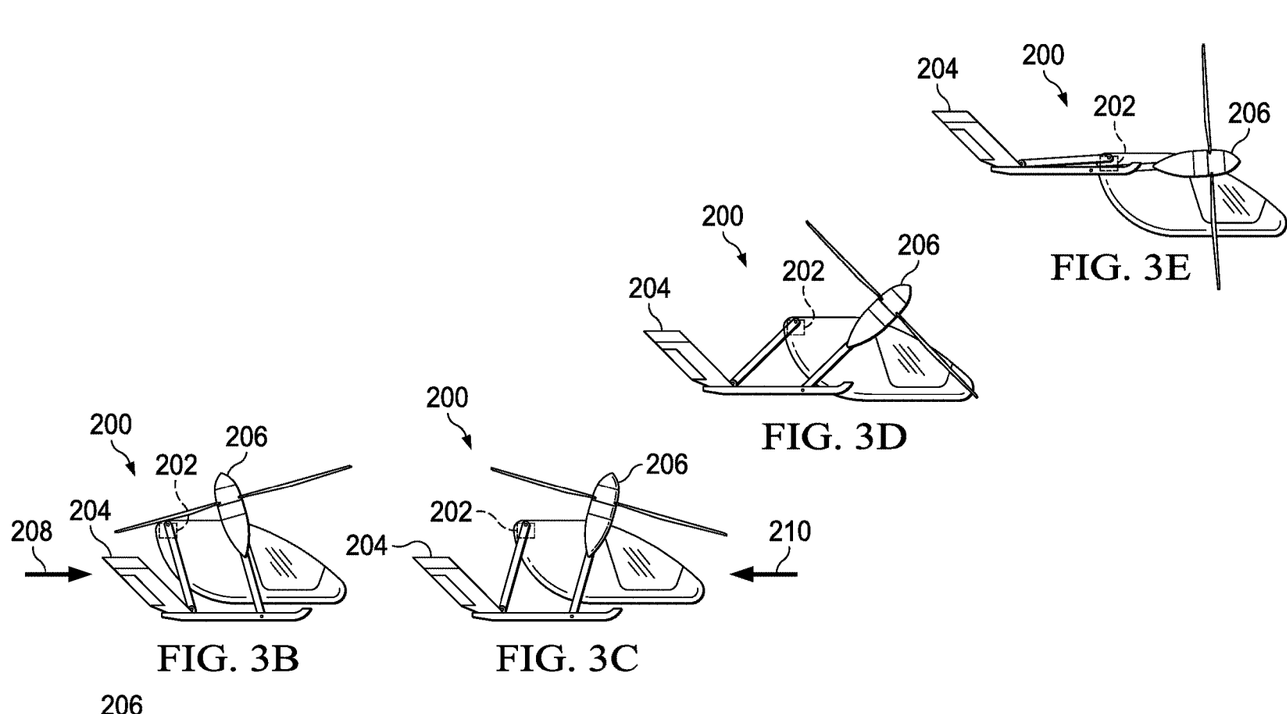
Figure 3F:
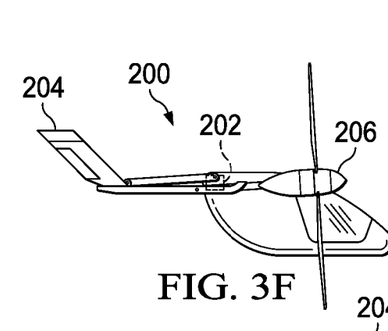
Figures 3G, 3H:
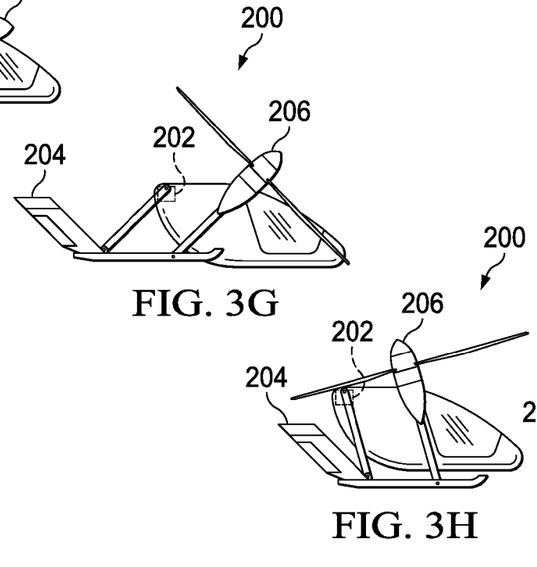
Figure 3I:
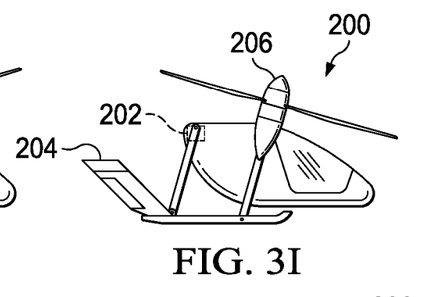
Figure 3J:
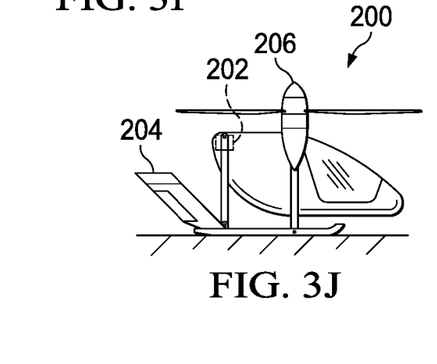
Figure 4A:
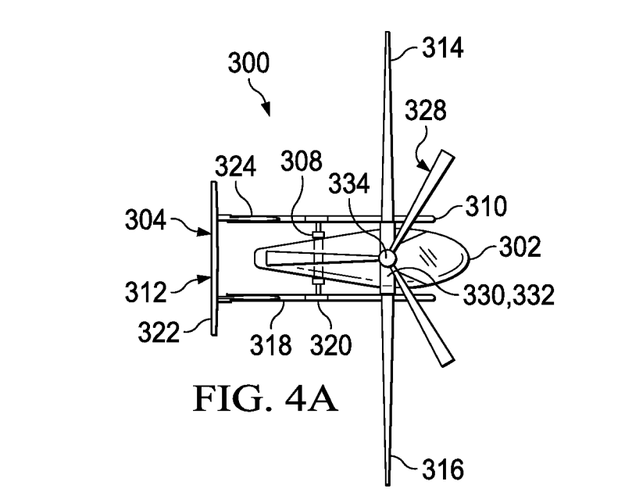
FIGS. 4A-4E are schematic illustrations of a tiltwing aircraft having a coaxial proprotor system and a convertible tailboom and landing gear system in accordance with embodiments of the present disclosure.
Figures 4B, 4C:
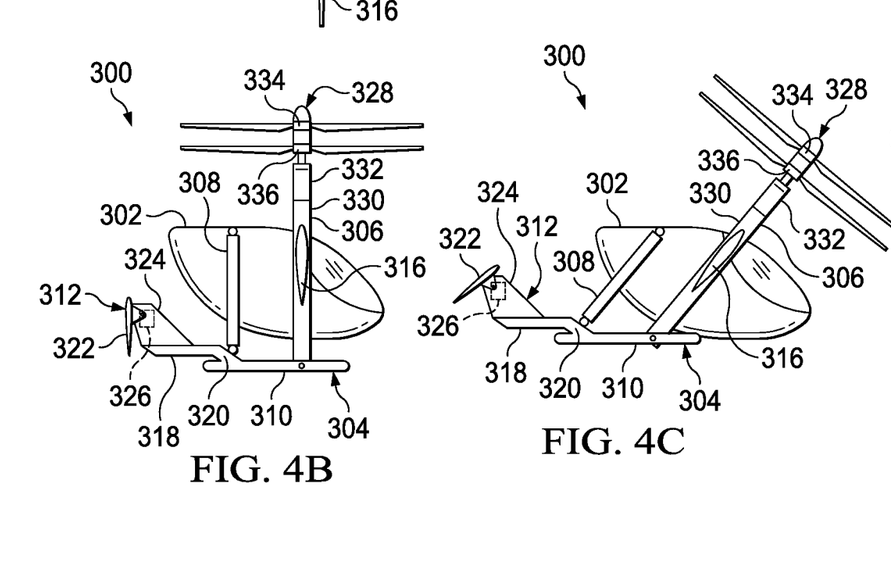
Figure 4D:
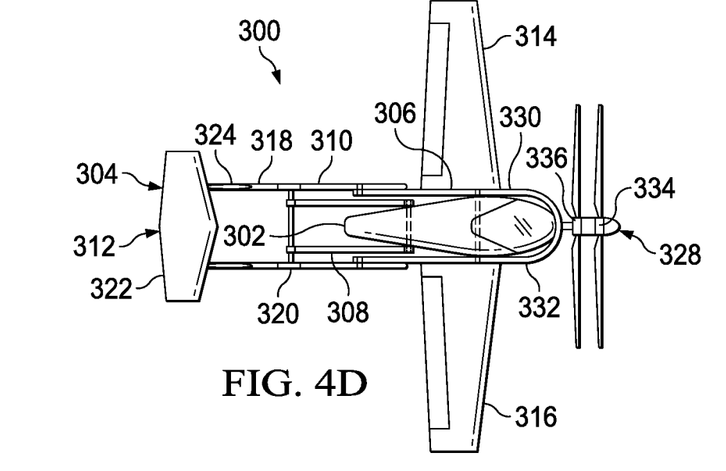
Figure 4E:
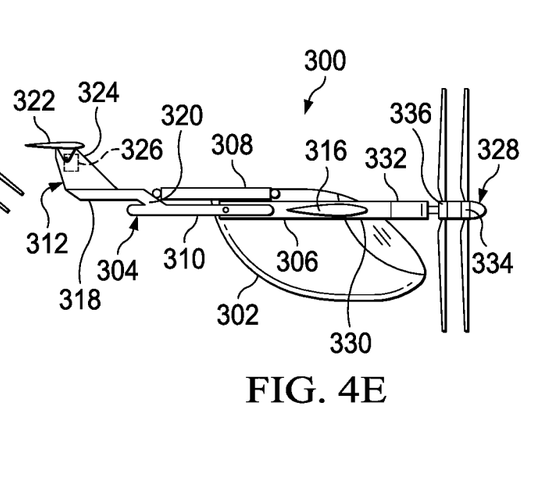

In FIG. 3D, conversion motor 202 rotates convertible tailboom and landing gear system 204 and proprotor assemblies 206 into the forward flight mode shown in FIG. 3E, in which convertible tailboom and landing gear system 204 is in the tailboom position. Tiltwing aircraft 200 maintains a low profile in the forward flight mode to increase range, efficiency and speed. When it is desired that tiltwing aircraft 200 return to hover mode or to land, conversion motor 202 rotates proprotor assemblies 206 toward the vertical orientation of the VTOL flight mode and rotates convertible tailboom and landing gear system 204 back into the landing gear position as shown in FIG. 3G. Upon rotating back into hover mode as shown in FIGS. 3H and 3I, tiltwing aircraft 200 may again have the ability to forwardly and aftwardly tilt proprotor assemblies 206 to counter any crosswinds. Tiltwing aircraft 200 may then land on a surface while convertible tailboom and landing gear system 204 is in the landing gear position as shown in FIG. 3J.

Referring to FIGS. 4A-4E in the drawings, a tiltwing aircraft is schematically illustrated and generally designated 300. Tiltwing aircraft 300 includes fuselage 302 to which convertible tailboom and landing gear system 304 is rotatably coupled. Convertible tailboom and landing gear system 304 includes leading linkages 306, trailing linkages 308, skids 310 and stabilizer 312. The inboard ends of tiltwings 314, 316 are fixedly coupled to leading linkages 306 such that tiltwings 314, 316 are indirectly rotatably coupled to fuselage 302 via leading linkages 306. In other embodiments, tiltwings 314, 316 or additional tiltwings may be coupled to trailing linkages 308. Convertible tailboom and landing gear system 304 has a two-tier configuration including raised tiers 318 coupled to aft portions of skids 310 via sloped transitions 320. The aft ends of trailing linkages 308 are rotatably coupled to sloped transitions 320 either directly or via an axle. Because raised tiers 318 are lifted off the ground during landing, raised tiers 318 help to prevent damage to the aft portion of convertible tailboom and landing gear system 304. Raised tiers 318 also improve yaw stability. Stabilizer 312 is coupled to raised tiers 318. Horizontal stabilizer 322 is rotatably coupled to vertical fins 324 and is rotatable into a substantially vertical position in the VTOL flight mode shown in FIGS. 4A and 4B and a substantially horizontal position in the forward flight mode shown in FIGS. 4D and 4E. Horizontal stabilizer 322 may be rotated using a motor or actuator 326.

Tiltwing aircraft 300 includes a coaxial proprotor system 328 rotatably coupled to fuselage 302. Coaxial proprotor system 328 is mounted on proprotor system mount 330, which is rotatably coupled to fuselage 302. Proprotor system mount 330 is coupled to leading linkages 306. In some embodiments, proprotor system mount 330 may be integral with leading linkages 306. Proprotor system mount 330 includes a forward mount arch 332 that rotates with leading linkages 306. Coaxial proprotor system 328 is coupled to forward mount arch 332. Because coaxial proprotor system 328 rotates with leading linkages 306, coaxial proprotor system 328 pivots about a pitch axis. In other embodiments, coaxial proprotor system 328 may be supported by other parts of tiltwing aircraft 300 such as tiltwings 314, 316. Coaxial proprotor system 328 is the singular propulsion system for tiltwing aircraft 300 and includes counter rotating top and bottom proprotor assemblies 334, 336. Proprotor assemblies 334, 336 may have variable pitch blades with collective and/or cyclic pitch capability or may have fixed pitch blades. Either or both rotor disks of proprotor assemblies 334, 336 may be tiltable to allow for forward, aft and lateral movement in the VTOL flight mode. Coaxial proprotor system 328 allows for a smaller spanwise footprint of tiltwing aircraft 300 and may reduce the weight and power required to hover in the VTOL flight mode. Coaxial proprotor system 328 may also increase hover power efficiency. In the VTOL flight mode, yaw may be managed using differential aileron deflection and longitudinal speed may be controlled by changing the rotor angle of coaxial proprotor system 328 relative to fuselage 302 about a pitch axis and by varying the deflection of horizontal stabilizer 322. In the forward flight mode, roll may be controlled using differential aileron deflection and pitch may be controlled by varying the deflection of horizontal stabilizer 322. Vertical fins 324 may include rudders to manage yaw. Rotor efficiency may be optimized by increasing blade pitch as a function of airspeed.

Figure 5:
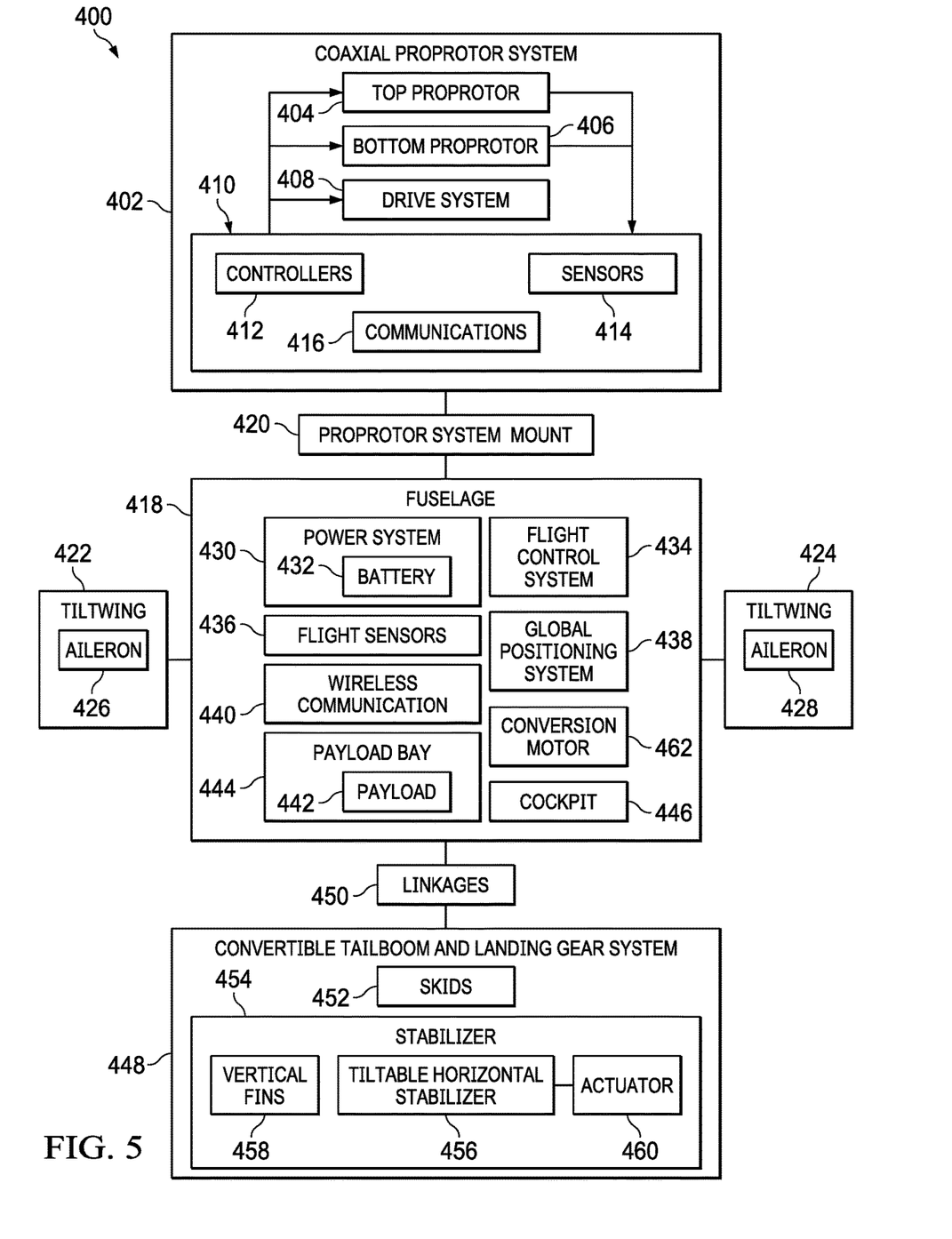
FIG. 5 is a block diagram of a propulsion and control system for a tiltwing aircraft having a coaxial proprotor system and a convertible tailboom and landing gear system in accordance with embodiments of the present disclosure.

Referring to FIG. 5 in the drawings, a propulsion and control system for a tiltwing aircraft such as tiltwing aircraft 300 in FIGS. 4A-4E is schematically illustrated and generally designated 400. Coaxial proprotor system 402 includes top and bottom proprotors 404, 406, drive system 408 including an electric motor and electronics node 410 including, for example, controllers 412, sensors 414 and communications elements 416 as well as other components suitable for use in the operation of coaxial proprotor system 402. Each proprotor 404, 406 includes a plurality of proprotor blades radiating therefrom. In some embodiments, coaxial proprotor system 402 includes one or more actuators (not shown) to adjust the collective and/or cyclic pitch of the proprotor blades.

Coaxial proprotor system 402 is mounted to fuselage 418 via proprotor system mount 420. Tiltwings 422, 424 including ailerons 426, 428 are rotatably coupled to fuselage 418. Fuselage 418 includes power system 430 including one or more batteries 432, flight control system 434, flight sensors 436, global positioning system 438, wireless communication components 440, payload 442 in payload bay 444 and cockpit 446, which may have the same, similar or analogous functionality and components as power system 140, battery 142, flight control system 148, flight sensors 150, global positioning system 152, wireless communication components 154, payload 156, payload bay 158 and cockpit 160 in fuselage 138 of tiltwing aircraft 100 in FIG. 2.

Convertible tailboom and landing gear system 448 is rotatably coupled to fuselage 418 via linkages 450. Convertible tailboom and landing gear system 448 includes skids 452 to which stabilizer 454 is coupled. Stabilizer 454 includes tiltable horizontal stabilizer 456 and one or more vertical fins 458. Tiltable horizontal stabilizer 456 is rotatable by actuator 460. Power system 430 may provide power to conversion motor 462 to transition convertible tailboom and landing gear system 448 between the landing gear position in the VTOL flight mode and the tailboom position in the forward flight mode. Power system 430 may also provide power to control surfaces 426, 428, 456 for pitch, roll and/or yaw control.

Figure 6:
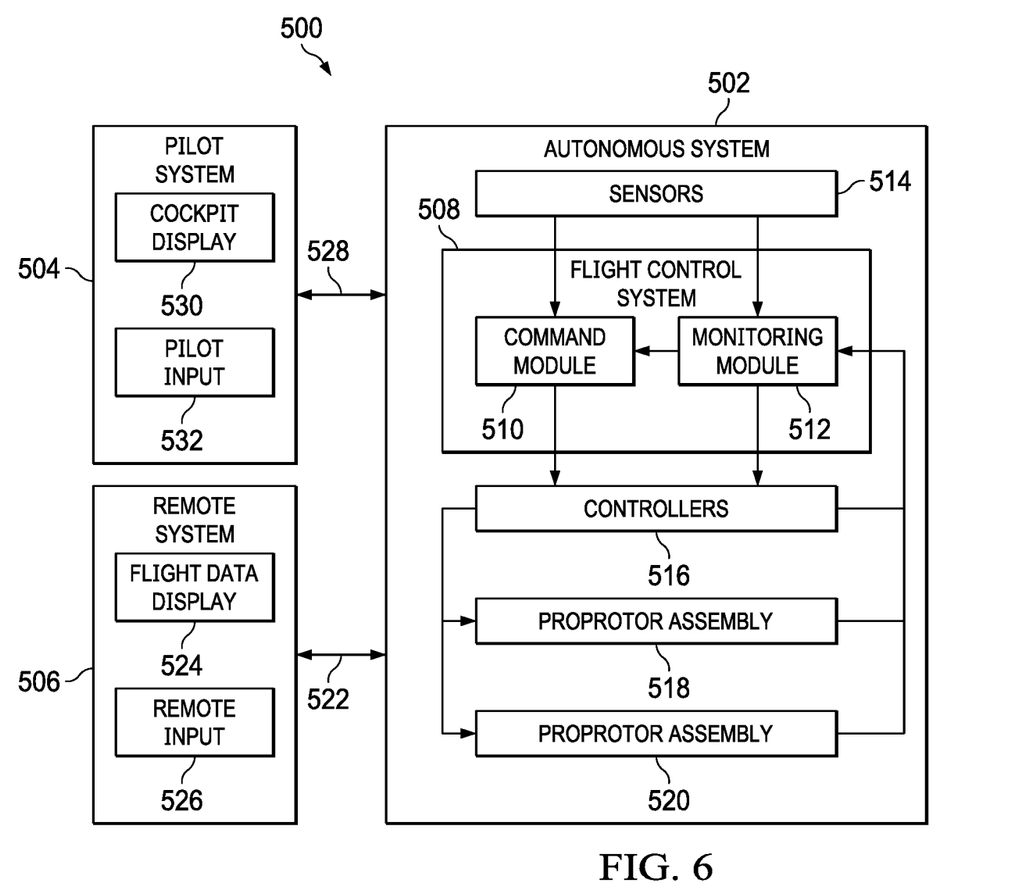
FIG. 6 is a block diagram of a control system for an aircraft having a convertible tailboom and landing gear system in accordance with embodiments of the present disclosure.

Referring to FIG. 6 in the drawings, a block diagram depicts an aircraft control system 500 operable for use with tiltwing aircraft 10 of FIGS. 1A-1F, tiltwing aircraft 300 of FIGS. 4A-4E or any other aircraft of the illustrative embodiments. In the illustrated embodiment, system 500 includes three primary computer based subsystems; namely, an autonomous system 502, a pilot system 504 and a remote system 506. As discussed herein, the aircraft of the present disclosure may be operated autonomously responsive to commands generated by flight control system 508 that preferably includes a non-transitory computer readable storage medium including a set of computer instructions executable by a processor. Flight control system 508 may be a triply redundant system implemented on one or more general purpose computers, special purpose computers or other machines with memory and processing capability. For example, flight control system 508 may include one or more memory storage modules including, but is not limited to, internal storage memory such as random access memory, non-volatile memory such as read only memory, removable memory such as magnetic storage memory, optical storage, solid-state storage memory or other suitable memory storage. Flight control system 508 may be a microprocessor-based system operable to execute program code in the form of machine-executable instructions. In addition, flight control system 508 may be selectively connectable to other computer systems via a proprietary encrypted network, a public encrypted network, the Internet or other suitable communication network that may include both wired and wireless connections.

In the illustrated embodiment, flight control system 508 includes a command module 510 and a monitoring module 512. It is to be understood by those skilled in the art that these and other modules executed by flight control system 508 may be implemented in a variety of forms including hardware, software, firmware, special purpose processors and combinations thereof. Flight control system 508 receives input from a variety of sources including internal sources such as sensors 514, controllers 516, proprotor assemblies 518, 520 such as proprotor assemblies 32, 34 in FIGS. 1A-1F and pilot system 504 as well as external sources such as remote system 506, global positioning system satellites or other location positioning systems and the like. For example, flight control system 508 may receive a flight plan including starting and ending locations for a mission from pilot system 504 and/or remote system 506. Thereafter, flight control system 508 is operable to autonomously control all aspects of flight of an aircraft of the present disclosure. In some embodiments, proprotor assemblies 518, 520 may instead be a coaxial proprotor system such as coaxial proprotor system 328 in FIGS. 4A-4E.

During the various operating modes of aircraft 500 including the VTOL flight mode, hover flight mode, forward flight mode and transitions therebetween, command module 510 provides commands to controllers 516. These commands enable independent operation of each proprotor assembly 518, 520 including, for example, controlling the rotational speed of the proprotors, changing the pitch of the proprotor blades, adjusting the thrust vectors and the like. In addition, these commands enable transition of aircraft 500 between the vertical lift orientation and the forward thrust orientation. Flight control system 508 receives feedback from controllers 516 and each proprotor assembly 518, 520. This feedback is processed by monitoring module 512 that can supply correction data and other information to command module 510 and/or controllers 516. Sensors 514, such as positioning sensors, attitude sensors, speed sensors, environmental sensors, fuel sensors, temperature sensors, location sensors and the like also provide information to flight control system 508 to further enhance autonomous control capabilities.

Some or all of the autonomous control capability of flight control system 508 can be augmented or supplanted by a remote flight control system 506. Remote system 506 may include one or computing systems that may be implemented on general purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet or any other type of network that couples a plurality of computers to enable various modes of communication via network messages using suitable communication techniques such as transmission control protocol/internet protocol, file transfer protocol, hypertext transfer protocol, internet protocol security protocol, point-to-point tunneling protocol, secure sockets layer protocol or other suitable protocol. Remote system 506 communicates with flight control system 508 via a communication link 522 that may include both wired and wireless connections.

Remote system 506 preferably includes one or more flight data display devices 524 configured to display information relating to one or more aircraft of the present disclosure. Display devices 524 may be configured in any suitable form, including, for example, liquid crystal displays, light emitting diode displays, cathode ray tube displays or any suitable type of display. Remote system 506 may also include audio output and input devices such as a microphone, speakers and/or an audio port allowing an operator to verbally communicate with, for example, a pilot on board aircraft 500. Display devices 524 may also serve as a remote input device 526 if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 504. Pilot system 504 may be integrated with autonomous system 502 or may be a standalone system preferably including a non-transitory computer readable storage medium including a set of computer instructions executable by a processor and may be implemented by a general purpose computer, a special purpose computer or other machine with memory and processing capability. Pilot system 504 may include one or more memory storage modules including, but not limited to, internal storage memory such as random access memory, non-volatile memory such as read only memory, removable memory such as magnetic storage memory, optical storage memory, solid-state storage memory or other suitable memory storage. Pilot system 504 may be a microprocessor-based system operable to execute program code in the form of machine-executable instructions. In addition, pilot system 504 may be connectable to other computer systems via a proprietary encrypted network, a public encrypted network, the Internet or other suitable communication network that may include both wired and wireless connections. Pilot system 504 may communicate with flight control system 508 via a communication channel 528 that preferably includes a wired connection.

Pilot system 504 preferably includes a cockpit display device 530 configured to display information to an onboard pilot. Cockpit display device 530 may be configured in any suitable form, including, for example, as one or more display screens such as liquid crystal displays, light emitting diode displays and the like or any other suitable display type including, for example, a display panel, a dashboard display, an augmented reality display or the like. Pilot system 504 may also include audio output and input devices such as a microphone, speakers and/or an audio port allowing an onboard pilot to verbally communicate with, for example, air traffic control or an operator of a remote system. Cockpit display device 530 may also serve as a pilot input device 532 if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinary skill in the art, through the use of system 500, an aircraft of the present disclosure can be operated responsive to a flight control protocol including autonomous flight control, remote flight control or onboard pilot flight control and combinations thereof.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tiltwing aircraft convertible between a vertical takeoff and landing flight mode and a forward flight mode comprising:
   a fuselage;
   a tiltwing rotatably coupled to the fuselage, the tiltwing rotatable between a plurality of positions including a substantially vertical position in the vertical takeoff and landing flight mode and a substantially horizontal position in the forward flight mode; and a convertible tailboom and landing gear system rotatably coupled to the fuselage, the convertible tailboom and landing gear system rotatable between a plurality of positions including a landing gear position in the vertical takeoff and landing flight mode and a tailboom position in the forward flight mode, the convertible tailboom and landing gear system comprising:
a plurality of skids each having an underside configured to contact a landing surface upon landing in the landing gear position, the underside of each skid facing downward in the tailboom position; and
a plurality of linkages rotatably coupling the skids to the fuselage;
wherein, in the landing gear position, the skids are positioned below the fuselage with a forward portion of the skids forward of the tiltwing; and
wherein, in the tailboom position, the skids extend aft of the fuselage with the forward portion of the skids aft of the tiltwing.

2. The tiltwing aircraft as recited in claim 1 wherein the convertible tailboom and landing gear system further comprises a horizontal stabilizer and one or more vertical fins, the horizontal stabilizer coupled to the skids via the one or more vertical fins.

3. The tiltwing aircraft as recited in claim 1 wherein the convertible tailboom and landing gear system is rotatable through an angular range of motion of at least 90 degrees.

4. The tiltwing aircraft as recited in claim 3 wherein the angular range of motion between the landing gear position and the tailboom position is approximately 90 degrees.

5. The tiltwing aircraft as recited in claim 3 wherein the linkages remain parallel throughout the angular range of motion.

6. The tiltwing aircraft as recited in claim 3 wherein the skids remain horizontal throughout the angular range of motion.

7. The tiltwing aircraft as recited in claim 1 wherein the convertible tailboom and landing gear system further comprises raised tiers coupled to aft portions of the skids and a stabilizer coupled to the raised tiers.

8. The tiltwing aircraft as recited in claim 1 wherein the skids are adjacent to an underside of the fuselage in the landing gear position and are adjacent to a top side of the fuselage in the tailboom position.

9. The tiltwing aircraft as recited in claim 1 wherein the linkages have aft ends rotatably coupled to inboard sides of the skids via revolute joints.

10. The tiltwing aircraft as recited in claim 1 wherein the linkages have forward ends rotatably coupled to lateral sides of the fuselage via revolute joints.

11. The tiltwing aircraft as recited in claim 1 wherein the linkages further comprise left and right leading linkages and left and right trailing linkages, the leading linkages having forward ends rotatably coupled to a middle section of the fuselage, the trailing linkages having forward ends rotatably coupled to an aft section of the fuselage.

12. The tiltwing aircraft as recited in claim 11 wherein the tiltwing further comprises left and right tiltwings each having an inboard end, the forward ends of the leading linkages fixedly coupled to the inboard ends of the tiltwings such that the tiltwings rotate with the leading linkages.

13. The tiltwing aircraft as recited in claim 1 wherein the linkages are approximately vertical in the vertical takeoff and landing flight mode and approximately horizontal in the forward flight mode.

14. The tiltwing aircraft as recited in claim 1 further comprising a proprotor assembly coupled to the tiltwing, wherein the tiltwing is forwardly and aftwardly tiltable in the vertical takeoff and landing flight mode to permit thrust vectoring.

15. The tiltwing aircraft as recited in claim 14 wherein the tiltwing, the proprotor assembly and the linkages are configured to synchronously rotate between the vertical takeoff and landing flight mode and the forward flight mode.

16. The tiltwing aircraft as recited in claim 1 further comprising a coaxial proprotor system having top and bottom proprotor assemblies; and
a proprotor system mount rotatably coupled to the fuselage, the proprotor system mount including a forward mount arch configured to rotate with the linkages, the coaxial proprotor system coupled to the forward mount arch.

17. An aircraft comprising:
a fuselage;
left and right tiltwings rotatably coupled to the fuselage; and
a convertible tailboom and landing gear system rotatably coupled to the fuselage, the convertible tailboom and landing gear system comprising:
a plurality of skids; and
a plurality of linkages rotatably coupling the skids to the fuselage;
wherein the aircraft is convertible between a vertical takeoff and landing flight mode and a forward flight mode;
wherein the convertible tailboom and landing gear system is rotatable between a plurality of positions including a landing gear position in the vertical takeoff and landing flight mode and a tailboom position in the forward flight mode, the skids positioned below the fuselage with a forward portion of the skids forward of the tiltwings in the landing gear position and the skids extending aft of the fuselage with the forward portion of the skids aft of the tiltwings in the tailboom position; and
wherein each skid has an underside configured to contact a landing surface upon landing in the landing gear position, the underside of each skid facing downward in the tailboom position.

18. The aircraft as recited in claim 17 further comprising left and right proprotor assemblies coupled to outboard ends of the left and right tiltwings, respectively.

19. The aircraft as recited in claim 17 further comprising a conversion motor configured to rotate at least one of the linkages to transition the convertible tailboom and landing gear system between the landing gear position and the tailboom position.

20. The tiltwing aircraft as recited in claim 1 wherein the linkages comprise left and right leading linkages and left and right trailing linkages, the left and right leading and trailing linkages extending in a uniform direction in the landing gear position and in the tailboom position.

* * * * *